United States Patent [19]

Adams, Jr. et al.

[11] 3,888,114
[45] June 10, 1975

[54] VERIFICATION MEANS FOR SHEAR WAVE ULTRASONIC INSPECTION SYSTEM

[75] Inventors: David O. Adams, Jr.; John H. Skaggs, both of Houston, Tex.

[73] Assignee: AMF Incorporated, White Plains, N.Y.

[22] Filed: Mar. 6, 1974

[21] Appl. No.: 448,574

[52] U.S. Cl. .............................. 73/67.8 R; 73/67.5 R
[51] Int. Cl. .......................................... G01n 29/04
[58] Field of Search ............ 73/67.5 R, 67.6, 67.7, 73/67.8 R, 67.85, 67.9

[56] References Cited
UNITED STATES PATENTS

| 3,074,267 | 1/1963 | Martin | 73/67.5 R |
|---|---|---|---|
| 3,512,399 | 5/1970 | Weinbaum | 73/67.5 R |
| 3,552,191 | 1/1971 | Heseding | 73/67.7 |
| 3,570,624 | 3/1971 | O'Connor | 73/67.5 R |
| 3,685,348 | 8/1972 | Bottcher | 73/67.8 R |

FOREIGN PATENTS OR APPLICATIONS

| 1,954,351 | 5/1971 | Germany | 73/67.8 R |

*Primary Examiner*—Richard C. Queisser
*Assistant Examiner*—John P. Beauchamp
*Attorney, Agent, or Firm*—George W. Price; John H. Gallagher

[57] ABSTRACT

Means for continuously monitoring the operation of a weld line ultrasonic inspection system to verify that shear wave ultrasonic inspection is being performed and to provide an alarm in the event that ultrasonic energy is not incident on the weld line being inspected.

10 Claims, 4 Drawing Figures

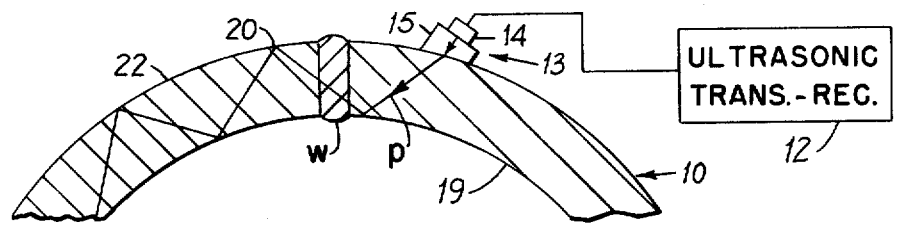
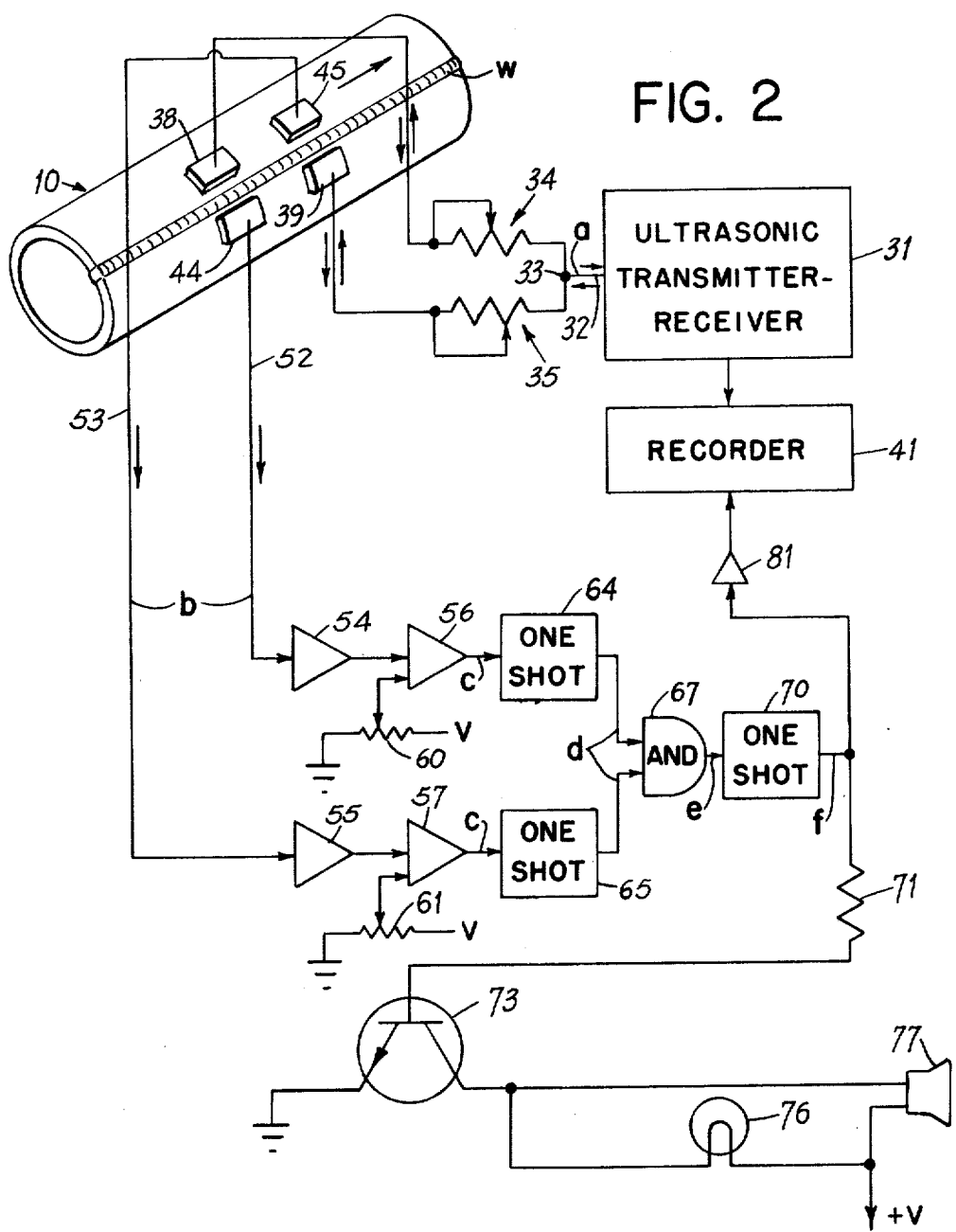
FIG. 1
FIG. 2

3,888,114

VERIFICATION MEANS FOR SHEAR WAVE ULTRASONIC INSPECTION SYSTEM

BACKGROUND OF THE INVENTION

In the manufacture of seam welded pipe or other tubular goods it is customary to nondestructively inspect the weld seam just after it is formed in order to maintain quality control of the manufactured pipe. Of the various nondestructive inspection techniques which may be used for this purpose, shear wave ultrasonic inspection has been found to be quite reliable in detecting potentially injurious anomalies, or defects, in the weld seam. However, one problem that has been encountered is that of providing assurance that the inspection system is properly operating and is properly coupled to the pipe, and is in fact propagating ultrasonic energy into and/or through the weld line of the pipe. A particular problem arises in verifying that ultrasonic energy is propagating into the weld line when the energy propagates in the pipe as shear waves. This probelm may be seen by referring to FIG. 1 wherein a section of pipe 10 being inspected is shown partially in cross section. Ultrasonic transmitting-receiving equipment 12 supplies electrical pulses to transducer 13 comprised of crystal element 14 and a coupling wedge 15. Transducer 13 responds to the electrical pulses and produces corresponding pulses of ultrasonic energy which are coupled to and propagate within pipe 10. Coupling wedge 15 is shaped and arranged so that the pulses of ultrasonic energy propagate along path p in pipe 10 in a shear wave mode of propagation. To assure good coupling of the ultrasonic energy to pipe 10, the region of contact of transducer 13 with pipe 10 may be wetted or flooded with a coupling fluid such as water, as is common practice. The launching of shear wave ultrasonic energy into a propagating medium is well understood by those skilled in the art and will not be further described.

As seen in FIG. 1, ultrasonic energy propagating along path p is reflected off inner wall 19 of pipe 10 and is incident on weld zone w. If the weld is a good and proper weld without reflecting anomalies therein, the ultrasonic energy will propagate through weld zone w substantially without reflection, will be reflected at point 20 on outer wall 22, and will continue along path p experiencing successive reflections off the respective walls of the pipe. As may be seen, if the weld being produced is a good weld there will be no reflections or echoes received back at transmitting-receiving equipment 12. On the other hand, if the transmitting equipment and its coupling leads are not properly operating, or if crystal 14 is not properly functioning, or if coupling wedge 15 is not in good coupling contact with pipe 10, no reflections or echoes will be received at the equipment 12 even if a reflecting anomaly is present at the region of weld line w adjacent transducer 13. Therefore, the operator of the system would have no way of knowing whether the absence of echo signals was because the weld line in fact had no anomalies or because some malfunction and/or some maladjustment existed in the system and transducer.

A system for determining the operating condition of an ultrasonic weld line inspection system is described in U.S. Pat. No. 3,512,399 issued May 19, 1970 to H. Weinbaum and assigned to applicants' assignee. In that system two transmit-receive ultrasonic transducers are positioned directly opposite each other on opposite sides of the weld line being inspected, but spaced at different distances therefrom. The two transducers are pulsed at the same time from a common source to simultaneously launch pulses of ultrasonic energy into the welded specimen being inspected. Each transducer will receive ultrasonic energy transmitted from the other, after the energy has passed through the weld line. Both transducers are coupled to an oscilloscope and when the inspection system is properly operating to detect an anomaly in the weld line the trace on the oscilloscope will show three spaced pulses. The first pulse corresponds to the anomaly detected by the transducer located nearest the weld line, and the third pulse corresponds to the anomaly detected by the transducer located farthest from the weld line. The middle pulse is largest in magnitude and corresponds to the signals from both transducers, each one having received ultrasonic energy transmitted from the other. This pulse always is present, even in the absence of an anomaly. In this system, the disappearance or any significant change in the magnitude of the middle pulse is an indication of a malfunction or maladjustment in the system.

Although the above-described system operates satisfactorily, it has some limitations. For example, because one transducer is located farther from the weld line than the other, the energy transmitted from the farthest transducer and reflected back thereto from an anomaly travels a longer distance in the tubular member and thus will suffer greater attenuation than will energy transmitted from and received back at the other transducer. Because of this the gain or attenuation of the signal channels to the two transducers must be adjusted to balance the magnitudes of the output signal therefrom. This requires constant attention and effort by the equipment operator.

Another limitation in the system described above arises when the pipe or tubular member being inspected has a relatively thick wall. For most accurate inspection it is desired to have ultrasonic energy propagate through the weld line along two oppositely directed paths which cross each other in the region of the weld line. One path runs through the weld line from lower left to upper right, and the other path runs from lower right to upper left, for example. With these two crossing propagation paths, if an anomaly is so oriented as not to be detected by ultrasonic energy propagating along one path, it most likely will be detectable by ultrasonic energy propagating in the other path which, in the region of the weld line, is transverse to the first path. Furthermore, it is desirable that the ultrasonic energy be reflected just once within the wall of the tubular member. In a system as above described where the two transmit-receive transducers must be spaced at different distances from the weld line and when inspecting thick wall pipe, it is difficult to provide just one reflection of ultrasonic energy transmitted by the farthest transducer, and when more than one reflection occurs in one propagating path, the two propagating paths may not cross in the region of the weld line. Instead, the paths may approach parallelism. As mentioned above, this geometry of the propagating paths reduces the effectiveness of the inspection.

SUMMARY OF THE INVENTION

In the inspection system of this invention two transmit-receive ultrasonic transducers are spaced apart along the weld line being inspected and are disposed on opposite sides of the weld line so that they propagate shear wave ultrasonic energy in respective opposite directions across the weld line. The two transducers operate simultaneously to produce respective transmitted ultrasonic pulses. In accordance with the present invention, two receive only ultrasonic transducers are spaced along the weld line on opposite sides thereof and each one is positioned directly across the weld line from a respective one of the transmit-receive transducers so as to detect ultrasonic energy propagating through the weld line and launched from its respective transmit-receive transducer. If the transmitting system and transmit-receive transducers are functioning properly to couple shear wave ultrasonic energy into pipe 10 and into the weld line, the two receive only transducers simultaneously produce electrical pulses in response thereto. The output signals of the two receive only transducers are coupled to pulse shaping means and to coincidence circuit means which respond to the simultaneous occurrence of said output signals to produce a control signal which inhibits an alarm means. If either or both of the receive only transducers fail to produce an output signal, the coincidence means will not produce an inhibiting control signal and the alarm will be activated to alert an operator that a malfunction or maladjustment is present in the system.

BRIEF DESCRIPTION OF THE DRAWINGS

FIG. 1 is a simplified illustration showing the propagation path of ultrasonic energy propagating in a shear wave mode through a cross sectional region of a pipe and is used in describing the background of the present invention;

FIG. 2 is a simplified schematic drawing, partially in block form, illustrating the verification means used with an ultrasonic inspection system;

DETAILED DESCRIPTION OF DRAWINGS

Figure 3:
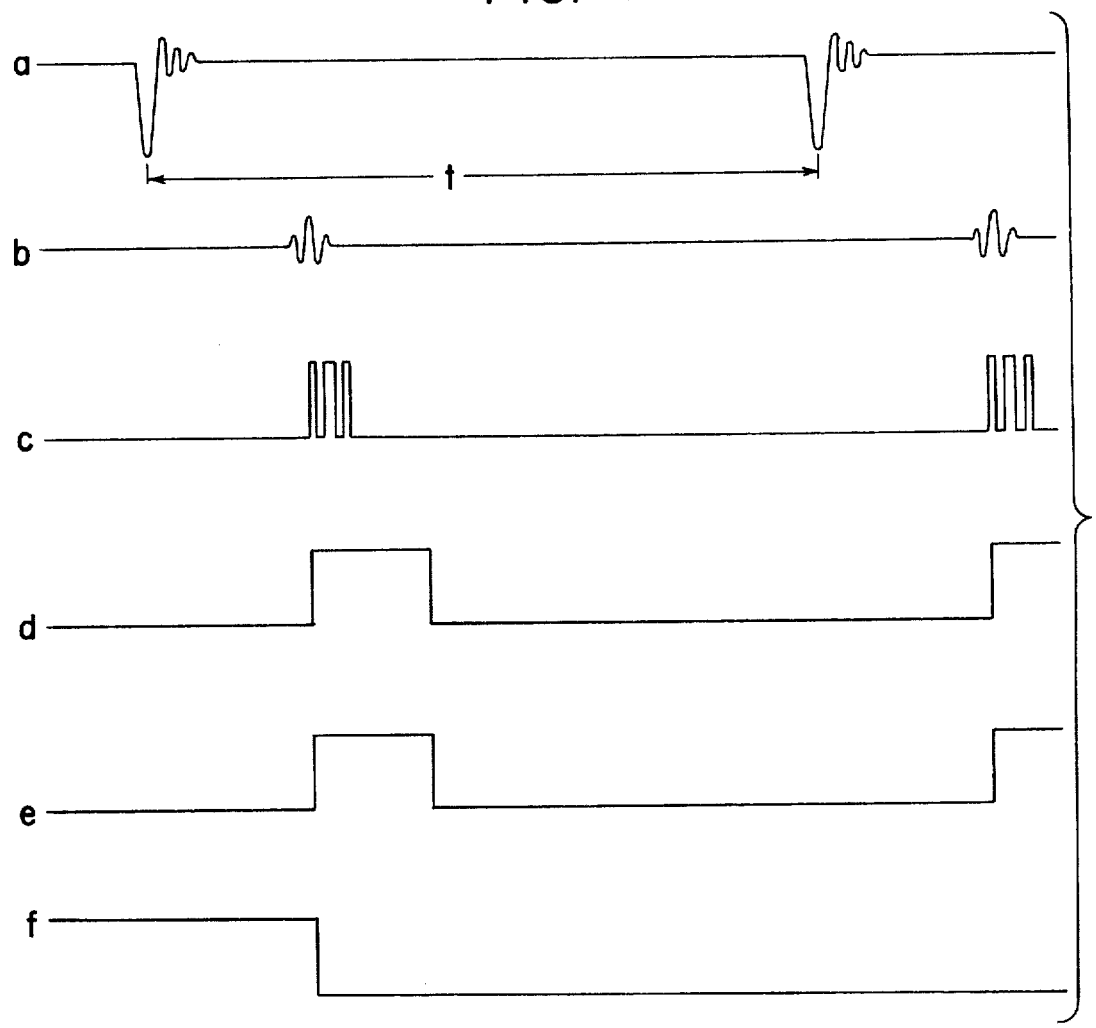
FIG. 3 is a series of waveforms used in describing the operation of the system of FIG. 2.

A presently preferred embodiment of the invention is illustrated in the simplified diagram of FIG. 2 and is comprised of an ultrasonic transmitter-receiver unit 31 which may be any one of various commercially available units which produce electrical pulses for transmission to ultrasonic transducers located on the specimen under test, and which also receives and processes electrical signals corresponding to pulses of ultrasonic energy reflected from anomalies within, and/or from surfaces of, the specimen under test. Pulses of electrical energy, such as illustrated by the waveform of FIG. 3a, are coupled over lead 32 from the transmitter portion of ultrasonic unit 31 to junction point 33 where the signal is split and passes through respective sensitivity adjust potentiometers or pads 33 and 34 to respective ultrasonic transducer heads 38 and 39 on tubular member 10. Transducer heads 38 and 39 are disposed on opposite sides of weld line w and are equally spaced therefrom. The transducer heads are of conventional construction for coupling respective pulses of ultrasonic energy into the wall of tubular member 10. The transducer heads may be of the type illustrated in FIG. 1. The heads include a transducing crystal 14 and a coupling wedge 15 of plastic material which propagates ultrasonic energy. The bottom edge of coupling wedge 15 is so shaped and angled relative to the outer surface of pipe 10 to launch into the wall of pipe 10 ultrasonic energy propagating in the shear wave mode. Additionally, in accordance with common practice, but not illustrated, the region of the pipe wall in contact with coupling wedge 15 may be flooded with an ultrasonic coupling fluid such as water to improve the coupling between the wedge and the pipe. Transducer heads 38 and 39 also receive respective reflections of ultrasonic pulses reflected from weld line w, and these reflections are transduced into corresponding electrical signals that are coupled back to the receiver portion of ultrasonic unit 31 where they are appropriately processed for recording on a recorder 41 which may be a strip chart recorder, an oscilloscope, or any other suitable type of device for indicating and/or permanently recording the received signals.

Two additional ultrasonic transducer heads 44 and 45 are positioned on opposite sides of weld line w and are respectively positioned directly across the weld line from transmit-receive transducer heads 38 and 39. Transducer heads 44 and 45 may be constructed similarly to the previously described heads 38 and 39, but each functions only to receive ultrasonic energy which propagates through weld line w from its respective transmit-receive transducer head located directly across the weld line from it. Heads 44 and 45 are the same distances from the weld line w, but not necessarily the same spacing therefrom as transmit-receive transducer heads 38 and 39. Desirably, transducer heads 38, 39 and 44, 45 are positioned so that the respective propagation paths from transducers 38 and 39 cross each other in the zone of the weld line in the manner illustrated in FIG. 4. It also is desired that the transmitted ultrasonic energy from each of the transducers 38 and 39 experience but one reflection off the inner wall of tubular member 10.

Figure 4:
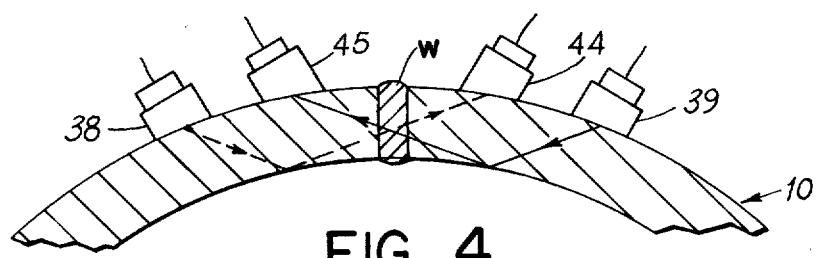
FIG. 4 is a cross sectional view of the zone of the weld line of the welded tubular member of FIG. 2 and shows the transducer heads and the propagating paths of ultrasonic energy associated therewith.

Relative motion is established between tubular member 10 and transducer heads 38, 39, 44 and 45 so that the weld line w moves transversely through the ultrasonic energy propagation paths illustrated in FIG. 4. The spacings of the transducer heads from the weld line and from each other remain unchanged during the relative motion. As an anomaly within the zone of the weld line W successively passes through the crossing propagating paths of ultrasonic energy transmitted from transducer heads 39 and 38, a portion of an impinging ultrasonic pulse will be reflected from the anomaly back to the transmit-receive transducer head from whence it emanated. Another portion of the ultrasonic energy in each of the propagating paths will pass directly through the zone of weld line w and will be received by the respective receive only transducer head 44 or 45. Of course, in the absence of an anomaly in a propagating path, the ultrasonic energy in that path will propagate through the weld line to its respective receive only transducer head substantially without reflection from the weld line.

Unreflected portions of ultrasonic pulses that propagate through the zone of weld line w along the two propagation paths are received by respective receive only transducers 44 and 45 and are transduced to corresponding electrical signals, FIG. 3b, which are coupled over lead 52 and 53 to respective r.f. amplifiers 54 and 55. Because the transmit pulses of ultrasonic unit 31 are split at junction 33 the "main bang" at transmit-receive transducer heads 28 and 39 both occur simultaneously. Furthermore, because the propagation paths between transducer heads 38, 44 and 39, 45 are of unequal lengths, when the system is operating properly, electrical signals of FIG. 3b will appear simultaneously at the inputs to respective r.f. amplifiers 54 and 55. If, however, the transmitter portion of ultrasonic unit 31 is not properly operating to produce the transmitter pulses of FIG. 3a electrical pulses will not be received by either r.f. amplifier 54 or 55. If there is an open or short circuit in the connection to either or both of the transmit-receive transducer heads 38 or 39, or if either or both of those heads are not properly coupled to tubular member 10, or if for some other reason transmit-receive transducers 38 and/or 39 are not properly functioning, electrical signals will not be simultaneously received at r.f. amplifiers 54 and 55.

Assuming that respective signals are simultaneously coupled to the inputs of r.f. amplifiers 54 and 55, the output signals of the amplifiers are respectively coupled to the inputs of comparator circuits 56 and 57 which function to pass only those signals which exceed the magnitude of a reference voltage which is established by the settings of respective potentiometers 60 and 61. The output signals of comparator circuits 56 and 57, FIG. 3c, are coupled to respective one shot pulse forming circuits 64 and 65, each of which produces an output pulse as illustrated in FIG. 3d. As an example, pulses of waveform 3d may have a duration of 10 micro-seconds.

The outputs of one shot circuits 64 and 65 are coupled as two inputs to AND gate 67. AND gate 67 produces the output signal of FIG. 3e only upon the simultaneous occurrence of input signals of FIG. 3d on both its input terminals.

The output of AND gate 67 is coupled to the input of a one shot pulse generator circuit 70 which is constructed to have an unstable state, FIG. 3f, whose time duration exceeds the time interval t, FIG. 3a, between successive transmitter output pulses of ultrasonic unit 31.

The output of one shot circuit 70 is coupled through resistor 71 to the base electrode of npn transistor 73. The emitter electrode of transistor 73 is grounded and its collector electrode is coupled to a voltage source through alarm means such as parallel connected lamp 76 and horn 77. The output of one shot circuit 70 also is coupled through amplifier 81 to recorder 41.

So long as the ultrasonic inspection system is properly functioning the receive only transducer heads 44 and 45 will simultaneously receive pulses of ultrasonic energy, and as explained, AND gate 67 will pass a signal to set one shot circuit 70 in its unstable state, which is the lower level of FIG. 3f. One shot circuit 70 will remain in its unstable state as long as the system is functioning properly because it will receive a new input pulse before its unstable state can terminate. Therefore, as long as signals are passed by AND gate 67 one shot circuit 70 has a low output to hold transistor 73 in its off condition. Alarm lamp 67 and horn 77 will not be energized in the off condition of transistor 73.

It is not uncommon for a satisfactorily operating ultrasonic inspection system to occasionally miss, or lose, a pulse. This is called a "drop out." In order to avoid false alarms upon the loss of a single, or perhaps a couple, of pulses in an otherwise properly operating system, the duration of the unstable state of one shot circuit 70 may be made equal to several times the pulse interval t, FIG. 3a.

In the event that one of the above-mentioned malfunctions should occur in the ultrasonic inspection system, one or both of the receive only transducer heads 44, 45 will not receive pulses of ultrasonic energy, and correspondingly, one or both input terminals of AND gate 67 will not receive an input signal. Therefore, AND gate 67 will not pass an output signal and one shot circuit 70 will return to its stable state and its output signal, FIG. 3f, will go to its higher level. Transistor 73 now is rendered conductive to its saturation condition and will activate the alarm means comprised of lamp 76 and horn 77. The change of state of one shot circuit 70 also will be coupled through amplifier 81 and will be recorded on recorder 41.

From the above discussion it is evident that the present invention affords means for reliably monitoring the operation of an ultrasonic weld line inspection system without affecting the quality of inspection. Further, the improved monitoring means requires but simple and relatively little additional apparatus. The monitoring means of this invention may be added to existing ultrasonic inspection systems with but little effort and expense.

What is claimed is:

1. In an ultrasonic inspection system for inspecting a member capable of propagating ultrasonic energy, means for monitoring the operation of the system comprising a plurality of pairs of ultrasonic transducers, the transducers of each pair being positioned on opposite sides of a zone of the member to be inspected and arranged to provide an ultrasonic energy propagation path therebetween which passes through said zone, said pairs of transducers being arranged relative to the zone so that all of the lengths of the propagation paths between pairs of transducers are substantially equal, means for simultaneously energizing one transducer of each of said pairs for simultaneously directing ultrasonic energy along each of said propagation paths and through said zone, means coupled to the other transducer of each of said pairs for producing a first output signal only when all of said other transducers are simultaneously energized by ultrasonic energy received in their respective propagation paths and for producing a second output signal only when said other transducers are not so simultaneously energized, and indicating means operable in response to the occurrence of said second output signal.

2. The combination claimed in claim 1 wherein at least one pair of said transducers is arranged to establish its propagation path through said zone in a direction which generally is transverse to the direction of the propagation path of another pair of said transducers.

3. The combination claimed in claim 2 wherein said one transducer in at least two pairs of said transducers are on opposite sides of said zone and operate to direct ultrasonic energy through said zone from opposite sides thereof.

4. The combination claimed in claim 3 wherein said first transducer of each pair is a transmit-receive transducer coupled to an ultrasonic transmit-receive unit and said other transducer of each pair is a receive only transducer coupled to means responsive to signals corresponding to ultrasonic energy received by said other transducer.

5. The combination claimed in claim 4 wherein the means coupled to the other transducer of each pair includes coincidence means which operates to produce said second output signal only in the absence of simultaneous energization of the other transducer of all pairs.

6. The combination claimed in claim 5 wherein the first transducer of all of said pairs are spaced substantially the same distance from said zone.

7. In an ultrasonic weld line inspection system having means for monitoring the operation of the system, the combination comprising first and second transmit-receive ultrasonic transducers disposed on opposite sides of the weld line of a welded member and adapted to transmit and receive ultrasonic energy directed into and reflected from the zone of said weld line, said two transducers being spaced substantially the same transverse distance from said weld line and being spaced apart in a direction parallel to the weld line, means for simultaneously energizing said transmit-receive transducers, whereby said transmit-receive transducers may simultaneously direct ultra-sonic energy along respective propagation paths which pass through said zone of the weld line, first and second receive only ultrasonic transducers each disposed across the weld line from a respective transmit-receive transducer and positioned to receive ultrasonic energy from the propagation path of its respective transmit-receive transducer, means connected to said receive only transducers for producing a first output signal only when the receive only transducers simultaneously are energized by energy received in their respective propagation paths and for producing a second output signal only when the receive only transducers are not simultaneously energized, means responsive to said second output signal for providing an indication that said receive only transducers have not been simultaneously energized.

8. In the ultrasonic inspection system claimed in claim 7 wherein said receive only transducers are spaced the same transverse distance from said weld line, whereby said two propagation paths are substantially equal in length.

9. The combination claimed in claim 8 wherein the welded member is a tubular member having a longitudinally extending weld line, and wherein said transducers being positioned and arranged relative to said weld line to produce but a single internal reflection of ultrasonic energy propagating between the walls of said member.

10. A method for monitoring the operation of an ultrasonic weld line inspection system comprising the steps establishing a first ultrasonic energy propagation path that commences at a first transmit-receive transducer located on a first side of a weld line of a welded member and which passes through the weld line and extends to a receive only transducer located on the opposite side of the weld line, establishing a second ultrasonic energy propagation path equal in length to said first path and spaced along the weld line from the first path, said second path commencing at a second transmit-receive transducer located on said opposite side of the weld line and passing through the weld line to a second receive only transducer located on said first side of the weld line, providing an energy source for simultaneously pulsing said transmit-receive transducers, recieving at said two transmit-receive transducers ultrasonic energy reflected back along the respective paths to the transmit-receive transducers, receiving at said two receive only transducers ultrasonic energy propagating thereto along the respective paths, producing respective electrical signals corresponding to ultrasonic energy received at said two receive only transducers, producing a given output signal when said respective signals do not occur simultaneously, and providing an indication upon sustained occurrence of said output signal.

* * * * *